(12) United States Patent
Ehrstedt et al.

(10) Patent No.: US 12,740,918 B2
(45) Date of Patent: Sep. 22, 2026

(54) MECHANICAL CARDIOPULMONARY RESUSCITATION DEVICE SUCTION CUP

(71) Applicant: Physio-Control, Inc., Redmond, WA (US)

(72) Inventors: Marcus Ehrstedt, Kävlinge (SE); Thomas Falk, Staffenstorp (SE); Fred W. Chapman, Newcastle, WA (US)

(73) Assignee: PHYSIO-CONTROL, INC., Redmond, WA (US)

( * ) Notice: Subject to any disclaimer, the term of this patent is extended or adjusted under 35 U.S.C. 154(b) by 881 days.

(21) Appl. No.: 17/534,049

(22) Filed: Nov. 23, 2021

(65) Prior Publication Data

US 2022/0175614 A1 Jun. 9, 2022

Related U.S. Application Data

(60) Provisional application No. 63/122,393, filed on Dec. 7, 2020.

(51) Int. Cl.
*A61H 31/00* (2006.01)
*F16K 15/14* (2006.01)

(52) U.S. Cl.
CPC ..... *A61H 31/006* (2013.01); *A61H 2201/013* (2013.01); *A61H 2201/1621* (2013.01);
(Continued)

(58) Field of Classification Search
CPC .................. A61H 31/00; A61H 31/006; A61H 2031/001; A61H 2031/002;
(Continued)

(56) References Cited

U.S. PATENT DOCUMENTS 2,244,973 A * 6/1941 Swan ..................... A61H 31/00 601/41
2,910,264 A * 10/1959 Lindenberger .......... F16B 47/00 248/362

(Continued)

FOREIGN PATENT DOCUMENTS

| | | | | | |
|---|---|---|---|---|---|
| CN | 111297668 | A | * | 6/2020 | |
| KR | 20140000145 | U | * | 1/2014 | A61M 1/08 |
| WO | WO-2018160709 | A1 | * | 9/2018 | A61H 31/007 |

OTHER PUBLICATIONS

Machine translation of KR20140000145U description and claims via google patents (Year: 2014).*

*Primary Examiner* — Bradley H Philips
*Assistant Examiner* — Tyler A Raubenstraw
(74) *Attorney, Agent, or Firm* — Miller Nash LLP

(57) ABSTRACT

Examples of the disclosure include a universal suction cup for a cardiopulmonary resuscitation device having a first circular member extending from a piston-facing surface, and a second circular member concentric to the first circular member extending from the piston-facing surface, the second circular member having a diameter that is less than the first circular member. Example of the disclosure also include suction cups with rigid members to reduce the amount of force necessary to attach the suction cup to a patient. Examples of the disclosure also include a mechanical compression device which can detect the type of suction cup attached to a compression member and activate particular features or settings based on the attached suction cup.

20 Claims, 6 Drawing Sheets

(52) U.S. Cl.
CPC .... *A61H 2201/1664* (2013.01); *F16K 15/147* (2013.01); *F16K 15/148* (2013.01)

(58) Field of Classification Search
CPC ...... A61H 2201/013; A61H 2201/1621; A61H 2201/1664; A61H 2201/1644; A61H 31/004; A61H 2201/0119; A61H 2201/1619; F16K 15/147; F16K 15/148
See application file for complete search history.

(56) References Cited

U.S. PATENT DOCUMENTS 3,514,065 A * 5/1970 Donaldson .............. F16B 47/00 248/363
4,570,615 A * 2/1986 Barkalow ............ A61H 31/008 601/106
4,748,973 A * 6/1988 Cho ....................... A61H 9/005 601/14
5,192,070 A * 3/1993 Nagai .................. B25J 15/0616 271/90
5,295,481 A * 3/1994 Geeham ................... A61N 1/38 601/43
6,309,364 B1 * 10/2001 Cathaud ................. A61H 7/008 601/126
7,728,548 B2 6/2010 Daynes et al.
8,584,997 B2 * 11/2013 Hajianpour ............. F16B 47/00 248/205.8
9,625,041 B1 * 4/2017 Lopez ................... F16K 31/535
9,907,971 B2 3/2018 Nova
9,916,436 B2 3/2018 Bielstein
11,013,660 B2 * 5/2021 Nilsson ................ A61H 31/006
11,246,796 B2 * 2/2022 Nilsson ................ A61H 31/007
2002/0002346 A1 * 1/2002 Horst ..................... A61H 9/005 601/6
2005/0080360 A1 * 4/2005 Katz .................... A61H 31/008 601/44
2006/0130831 A1 * 6/2006 Chang .................. A61H 31/007 128/202.28
2007/0277826 A1 * 12/2007 Lurie ..................... A61H 31/00 128/205.24
2008/0017764 A1 * 1/2008 Nan ....................... F16M 13/02 601/127
2008/0300515 A1 * 12/2008 Nozzarella ........... A61H 31/006 601/41
2009/0118573 A1 * 5/2009 Tsao .......................... A61F 5/41 600/38
2013/0030333 A1 * 1/2013 Cicenas ............... A61H 31/005 601/41
2013/0072830 A1 * 3/2013 Illindala ............... A61H 31/006 601/41
2015/0073314 A1 * 3/2015 Parascandola ......... A61H 31/00 601/41
2015/0105705 A1 * 4/2015 Freeman .............. A61H 31/006 601/41
2015/0119768 A1 * 4/2015 Meier .................. A61H 31/006 601/41
2016/0053756 A1 * 2/2016 Han ...................... F16K 15/148 251/332
2016/0143804 A1 * 5/2016 Nilsson ................ A61H 31/006 601/41
2018/0092804 A1 * 4/2018 Hunt .................. A61N 1/39044
2019/0017536 A1 * 1/2019 White .................. F16M 13/022
2019/0021943 A1 * 1/2019 Nilsson ................ A61H 31/005
2019/0117501 A1 * 4/2019 Chapman ................. A61H 1/00
2019/0224434 A1 * 7/2019 Silver ...................... A61B 5/08
2019/0255340 A1 * 8/2019 Freeman .............. A61H 31/007
2019/0282324 A1 * 9/2019 Freeman .............. A61H 31/005
2019/0374429 A1 * 12/2019 Giacometti .......... A61H 31/007
2019/0374430 A1 * 12/2019 Perdu ................... A61H 31/006
2020/0306134 A1 * 10/2020 Montgomery ....... A61H 31/006
2021/0093506 A1 * 4/2021 Reynolds ............. A61H 31/006
2021/0283009 A1 * 9/2021 Lagerström .......... A61H 31/006
2022/0071840 A1 * 3/2022 Voss ................... A61N 1/39044

* cited by examiner

MECHANICAL CARDIOPULMONARY RESUSCITATION DEVICE SUCTION CUP

CROSS-REFERENCES TO RELATED APPLICATIONS

This patent application is a claims the benefit of U.S. provisional application No. 63/122,393, filed Dec. 7, 2020. That application is incorporated into the present disclosure by this reference.

TECHNICAL FIELD

This disclosure is directed to systems and methods related to mechanical cardiopulmonary resuscitation (CPR) devices, and in particular, to suctions cups and identification of suction cups for a mechanical CPR device.

BACKGROUND

Many conventional CPR devices utilize a suction cup to attach a piston to a chest of a patient for performing CPR compressions and decompressions. These suctions cups are generally a one-size-fits-all, which does not work well for smaller patients, such as infants. Some CPR devices allow a user to remove a suction cup and add a new suction cup, but this can take time and a rescuer may not have the correct suction cup size available.

Further, suction cups are generally designed to stick or attach to polished, flat, and hard surfaces, while a chest of a patient has curves in multiple directions. However, during CPR compressions, it can be beneficial to have a suction cup capable of lifting a chest of the patient back to its original position before performing another compression. For a suction cup to stick to the topology of a chest of a patient, it often needs to have a certain height to adequately attach to the chest of the patient, but this requires further force to empty the air in the suction cup when attaching, which may not be desirable.

Configurations of the disclosed technology address shortcomings in the prior art.

BRIEF DESCRIPTION OF THE DRAWINGS

Aspects, features and advantages of examples of the present disclosure will become apparent from the following description of examples in reference to the appended drawings in which.

DETAILED DESCRIPTION

Examples of the disclosure are directed to suction cups for mechanical compression devices which can be used on a variety of different sizes of patients, suction cups that can adhere to a chest of a patient with less force, and/or suction cups which can be identified by the mechanical compression device so that the mechanical compression device may automatically adjust its settings based on the type of suction cup attached.

Figure 1:
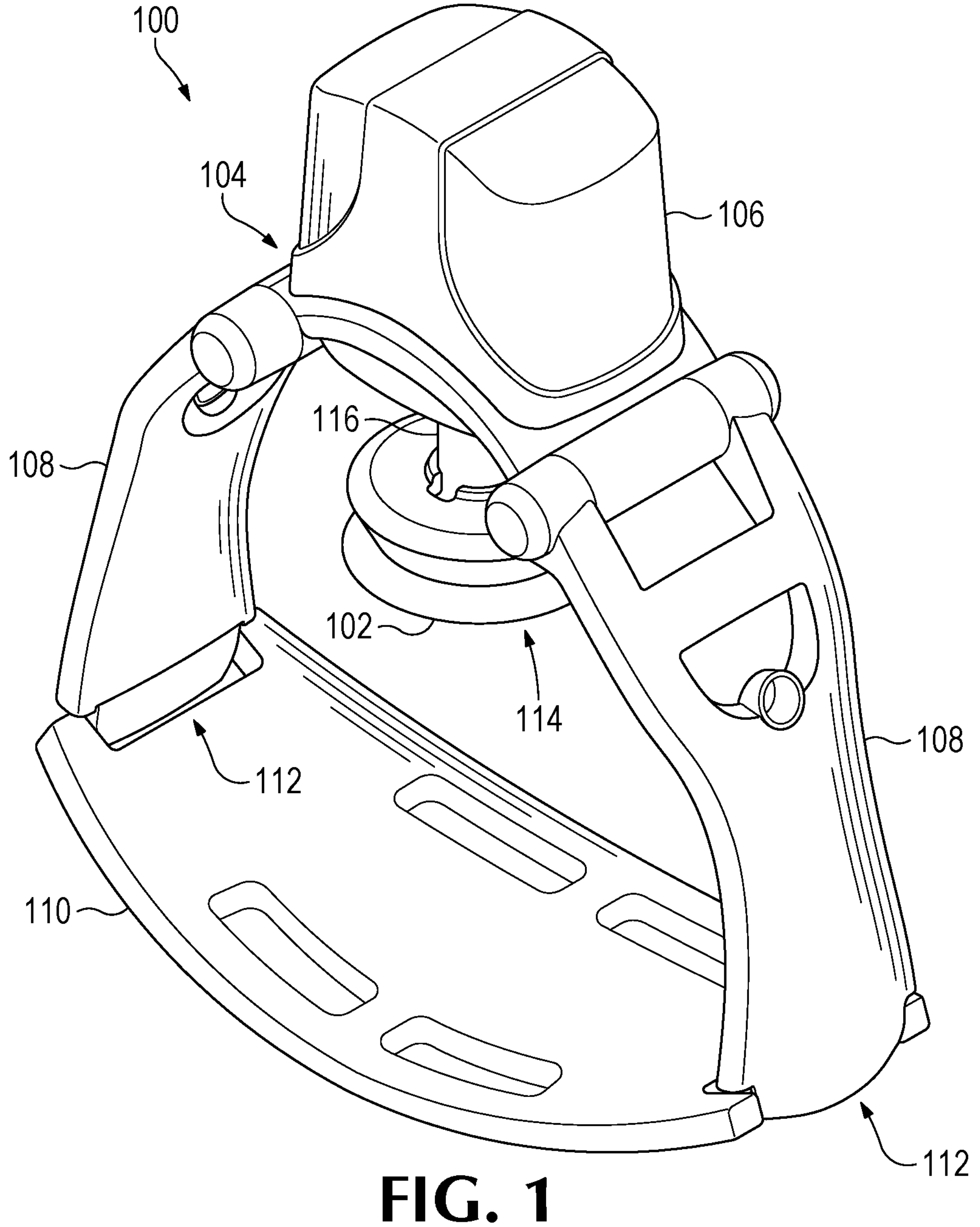
FIG. 1 is a perspective view of an example mechanical compression device.

FIG. 1 is a front view of an example CPR device 100 that uses a suction cup 102 to adhere to a chest of a patient. While FIG. 1 is described to illustrate a mechanical compression device, examples of the disclosure are not limited to this particular type of compression device, but may be used with any compression device that utilizes a suction cup 102 when providing compressions.

As will be understood by one skilled in the art, the mechanical CPR device 100 may include additional components not shown in FIG. 1. As illustrated in FIG. 1, a CPR device 100 may include a support structure 104 and a central unit 106. The support structure 104 may include support legs 108 and a base member 110. The support leg 108 and the base member 110 meet at a junction 106 between the support leg 108 and the base member 110.

The support leg 108 may be configured to support the central unit 106 at a distance from the base member 110. For example, if the base member 110 is underneath the patient, who is lying on the patient's back, then the support leg 108 may support the central unit 106 at a sufficient distance over the base member 110 to allow the patient to lay within a space between the base member 110 and the chest compression mechanism 114, while positioning the chest compression mechanism 114 over the patient's chest. The base member, or back plate, 110 may be configured to be placed underneath the patient, for example when the patient is lying on the patient's back.

The central unit 106 may be configured to deliver CPR chest compressions to the patient. The central unit 106 may include, for example, a motor-driven piston 116 configured to contact the patient's chest through the suction cup 102 to provide the CPR compressions. The central unit 106 may also include a number of electronic components to drive the motor-driven piston 116. Attached the motor-driven piston 116 is a suction cup 102 which adheres to the chest of the patient during chest compressions. The suction cup 102 can allow the motor-driven piston 116 to lift the chest back to a resting height, or provide a full decompression of the chest of the patient, when the motor-driven piston 116 is retracted from an extended position.

Figure 2:
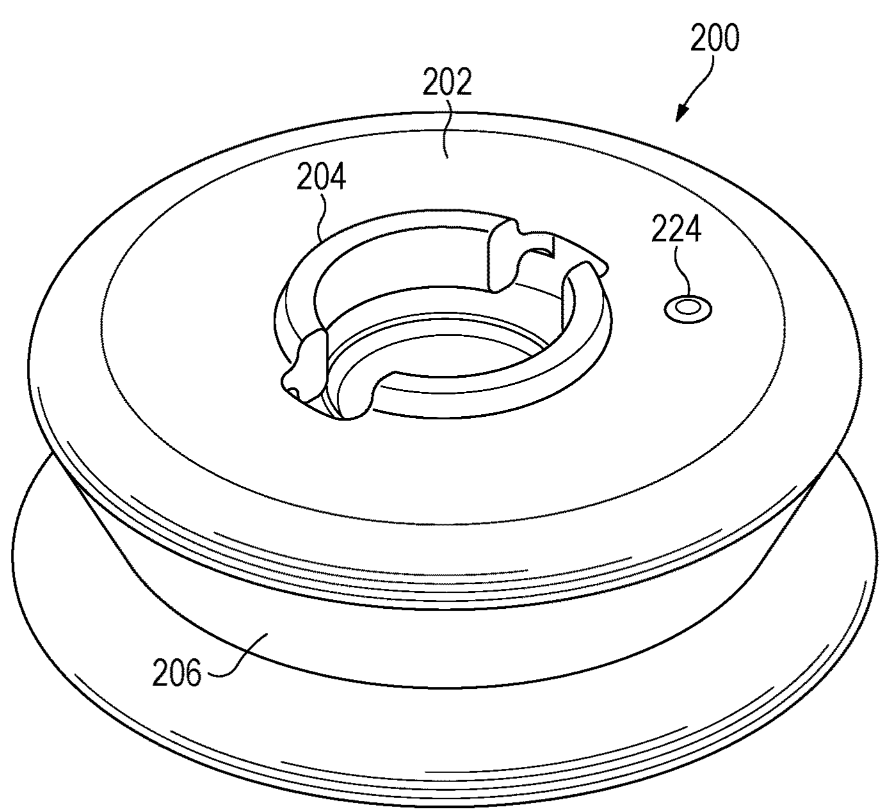
FIG. 2 is a perspective top view of a suction cup according to examples of the disclosure.

FIG. 2 illustrates a perspective view of a suction cup 200 according to some examples of the disclosure which may be attached to the motor-driven piston 116 as suction cup 102. The suction cup 200 includes a piston-facing surface 202 which includes a connector 204 for attaching to a piston of a mechanical compression device, such as the piston 116, for example. The connector 204 can be any connection device or mechanism which attaches the piston of a mechanical compression device to the suction cup 200.

In the example suction cup 200 illustrated in FIG. 2, the connector 204 has a concave portion which defines a cavity of the piston-facing surface 202 that can be structured to receive a piston and attach to the piston by friction. The connector 204 however, is not limited to this structure and could be any attachment mechanism, such as a screw, hook-and-loop fastener, a pin which can be received in a hole in both of the connector 204 and the piston, etc. to receive the piston and attach the suction cup 200 to the piston.

The suction cup 200 can include a first circular member 206 which extends from the piston-facing surface 202 in a first direction. The first circular member 206 forms a suction cup which can attach to a chest of a larger-sized patient. The first circular member 206 may not extend downward from the piston-facing surface 202 in a straight line, but may be concave or convex at different points to provide adequate suction when attached to a patient's chest.

Figure 3:
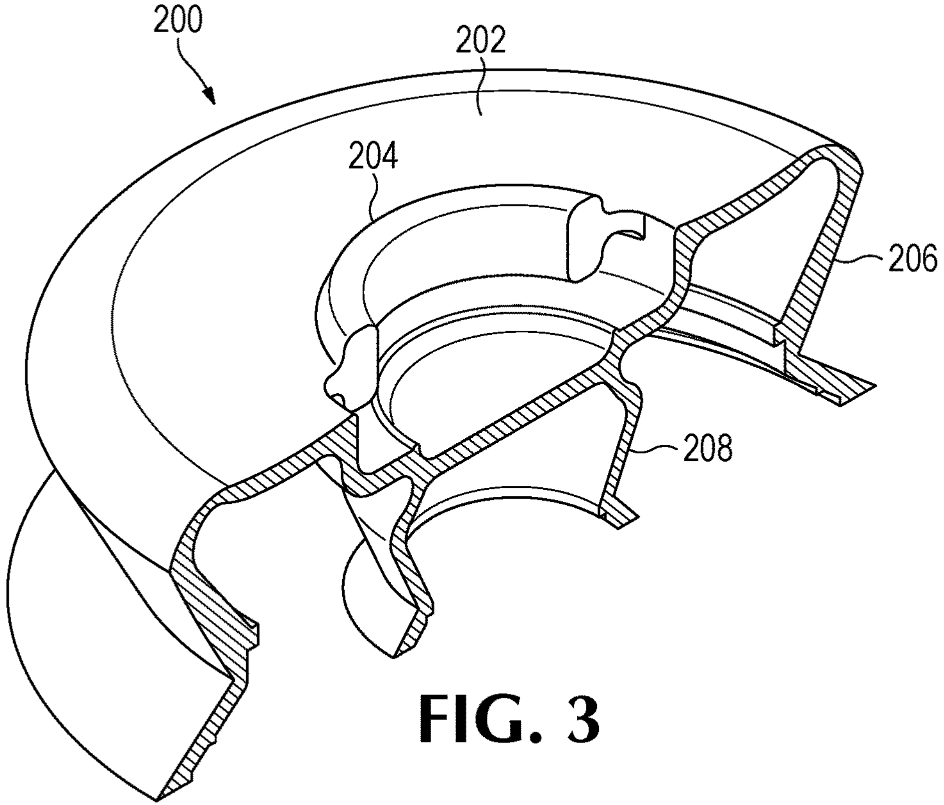
FIG. 3 is a perspective cross-section view of the suction cup of FIG. 2.

FIG. 3 illustrates a perspective, cross-section view of the suction cup 200 that illustrates a second circular member 208 that also extends from the piston-facing surface 203 in the first direction. The second circular member 208 also forms a suction cup which has a diameter 214 that is less than the diameter 212 of the first circular member 206. Similar to the first circular member 206, the second circular member 208 may not extend from the piston-facing surface 202 in a straight line, but may be concave or convex at different points to provide suction when attached to a patient's chest.

Figure 4:
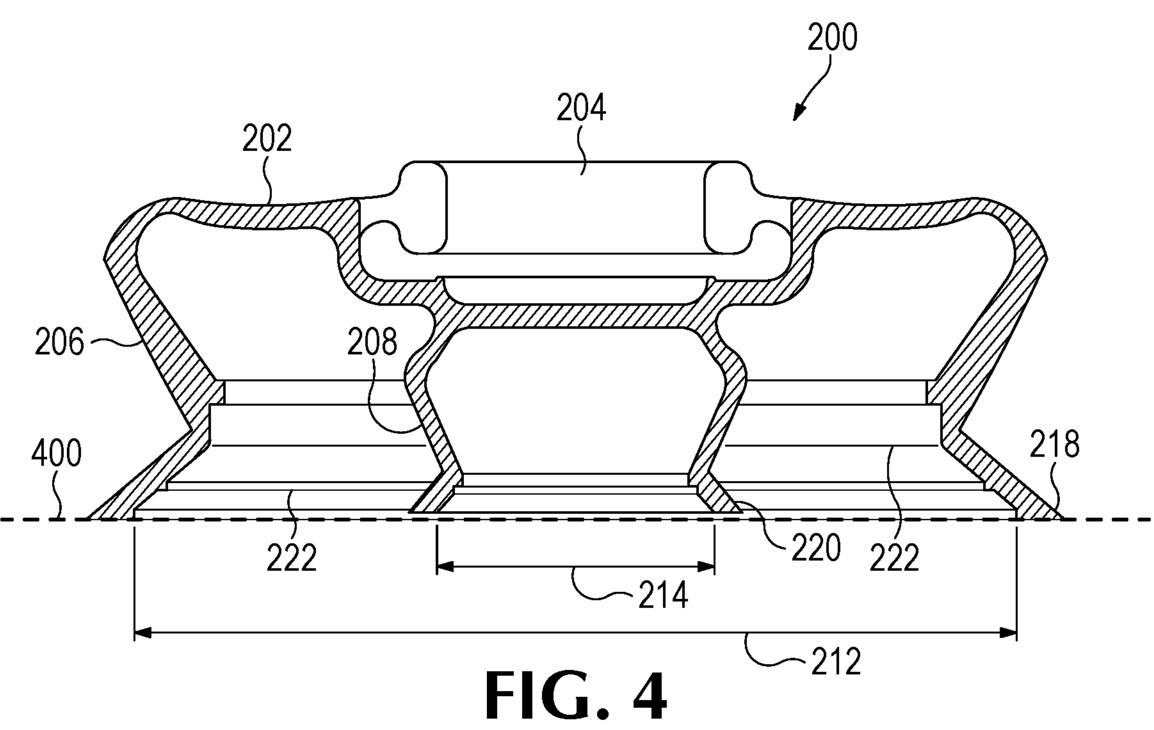
FIG. 4 is a front cross-section view of the suction cup of FIG. 3.

FIG. 4 illustrates a cross-section view of the suction cup 200. As can be seen in FIG. 4, each of the first circular member 206 and the second circular member 208 extend from the piston facing surface 202 to a plane 400 that is generally parallel to the piston-facing surface 202. Stated another way, a distal end 218 of the first circular member 206 may define the reference plane 400, and a distal end 220 of the second circular member 208 may likewise extend to the plane 400. Although FIGS. 2 and 4 illustrate the second circular member 206 extending from the concave portion of the piston-facing surface 202, the second circular member 208 may extend from any portion of the piston-facing surface 202, so long as the diameter 214 of the second circular member 208 is less than the diameter 212 of the first circular member 206 and extends to the plane 400.

When applied to a piston of a mechanical compression device, the suction cup 200 can attach to a chest of a large patient via the first circular member 206. The second circular member 208 may also attach to the chest of a larger patient. However, sometimes mechanical chest compression devices are used on smaller patients, such as smaller adults or pediatric patients. In such instances, the first circular member 206 will be too large to attach to the chest of the smaller patient, but the second circular member 208 will attach to the chest of the smaller patient. This can allow for a single, universal suction cup 200 to be used with the piston of the mechanical compression device. This may result in quicker treatment of a patient, since a rescuer will not need to change out the suction cup. Further, a rescuer will not have to keep track of multiple suction cups and try to determine which size suction cup is appropriate for each patient.

As illustrated in FIG. 4, the suction cup 200 may include ridges 222 located at a distal end 218 of the first circular member 206 or a distal end 220 of the second circular member 208, or both. The ridges 222 can protrude from the first circular member 206 or the second circular member 208, or both to help improve and preserve attachment of the suction cup 200 to the patient.

Figure 5:
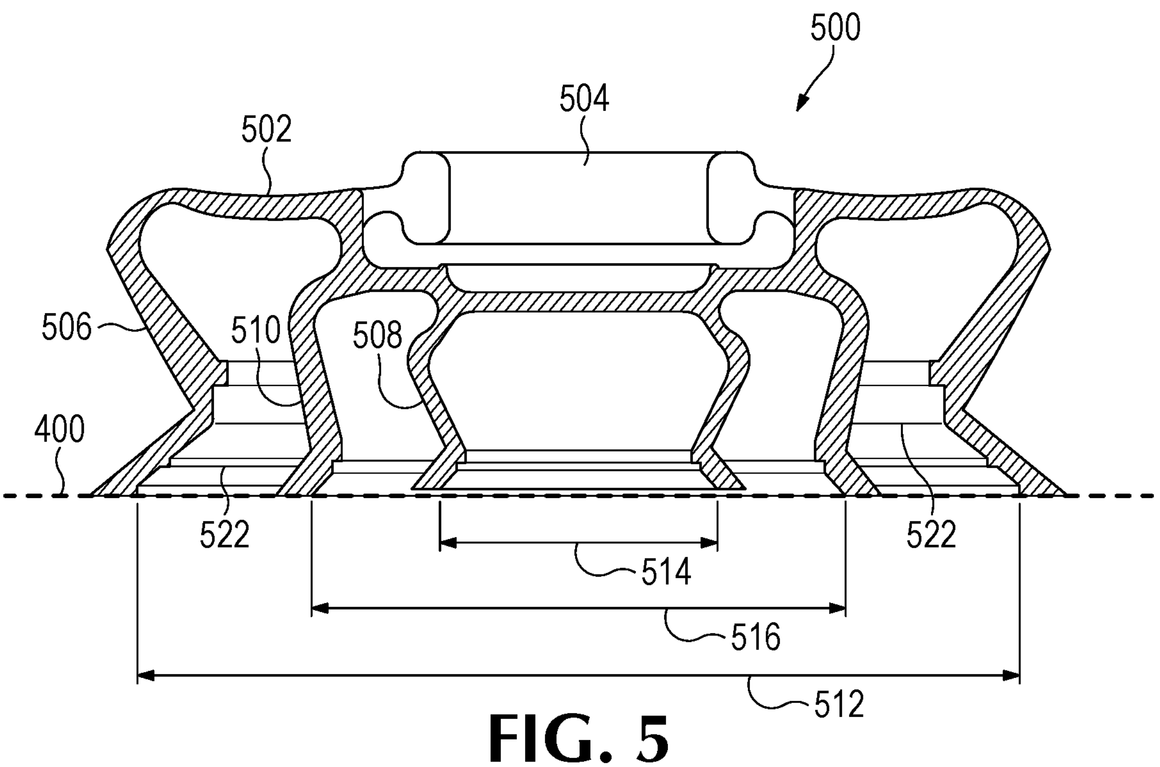
FIG. 5 is a front cross-section view of another suction cup according to some examples of the disclosure.

FIG. 5 illustrates another example of a suction cup 500 according to some examples of the disclosure. The suction cup 500 includes a piston-facing surface 502, a connector 504, a first circular member 506, and a second circular member 508 each of which are similar and have the same features as the piston-facing surface 202, connector 205, first circular member 206, and second circular member 208, and as such will not be discussed in detail.

In this example, the suction cup 500 includes more than two circular members. That is, the suction cup 500 includes a third circular member 510. The third circular member 510 has a diameter 516 that is less than a diameter 512 of the first circular member 506 but that is greater than a diameter 514 of the second circular member 508. Similar to the suction cup 200, each of the first circular member 506, second circular member 508, and third circular member 510 extend from the piston-facing surface 502 to the plane 400.

The suction cup 500 can allow for even more variety in attaching to patients with different size chests. This may allow for a better attachment to a patient's chest that is slightly too small for the first circular member 506. Examples of the disclosure, however, are not limited to two or three circular members, as shown in FIGS. 3-5. Rather, suction cups of the disclosure may contain a number of different circular members, such as between one and five, extending from a piston-facing surface, each circular member having a different diameter. This can allow the suction cups to adhere adequately to a large number of patient sizes. For example, if a patient chest is slightly too small for the outer, or first circular member, to attach, but may be large enough that only attaching by the inner circular member would not be adequate, having a number of interior circular members can provide the best suctioning of the chest to perform CPR compressions and decompressions.

As illustrated in FIG. 5, the suction cup 500 may include ridges 522 located at a lower portion of one or more of the first circular member 506, the second circular member 508, and the third circular member 510. The ridges 522 can protrude from one or more of the first circular member 506, the second circular member 508, and the third circular member 510 to help improve and preserve attachment of the suction cup 500 to the patient.

Figure 6:
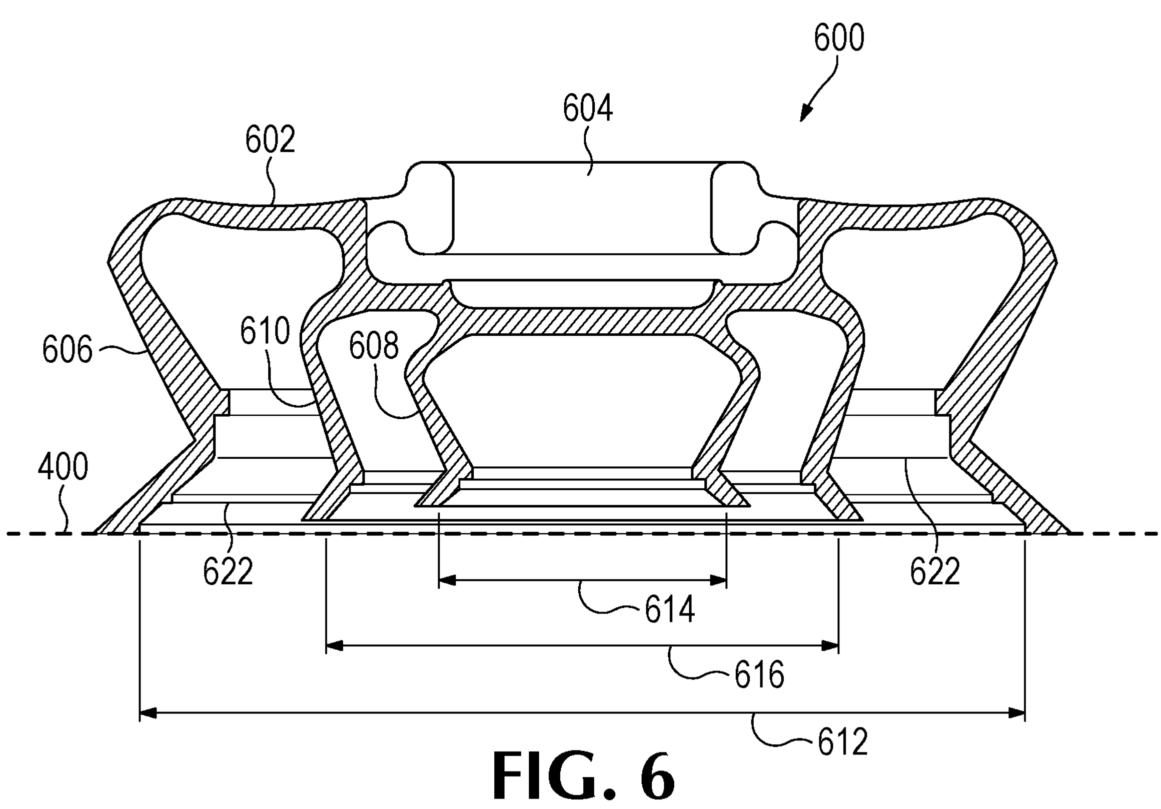
FIG. 6 is a front cross-section view of another suction cup according to some examples of the disclosure.

In some examples, instead of each of the circular members extending to the same plane 400, the circular members may be offset from the plane 400. For example, FIG. 6 illustrates a suction cup 600. Suction cup 600 includes a piston-facing surface 602, a connector 604, a first circular member 606, a second circular member 608, and a third circular member 610. The piston-facing surface 602 and the connector 604 have the same features as the piston-facing surface 502 and connector 504, and as such will not be discussed in detail.

Similar to suction cup 500, the first circular member 606 extends from the piston-facing surface to a plane 400. The first circular member 606 has the largest diameter 612. The second circular member 608 has the smallest diameter 614, while the diameter 616 of the third circular member 610 is between the diameter 612 of the first circular member 606 and the diameter 614 of the second circular member 608.

In the example suction cup 600, the first circular member 606 extends to the plane 400. The second circular member 608, however, does not extend to the plane 400 and is offset from the plane 400 by a first distance. The third circular member 610 is offset from the plane 400 by a second distance. For example, the first distance may be two to ten millimeters from the plane 400 and the second distance may be one to five millimeters. Examples of the disclosure, however, are not limited to these distances, and any distance may be used for the offset so that interior circular members do not attach to a chest of the patient when an outer circular member is attached.

Although FIG. 6 illustrates three circular members, the suction cup 600 is not limited to three circular members, and any number of circular members, such as between one and five, may be provided, and each circular member may be offset a distance from the plane 400. For example, each circular member may be offset the same distance from the next longest circular member. For example, a first circular member may extend to a first plane, while a second member extends to a second plane which is offset a first distance from the first plane. If a third circular member is present, the third circular member may extend to a third plane, which is different from both the second plane and the first plane. The third plane may be offset from the second plane by the first distance. Each of a fourth and/or fifth circular member would further extend to fourth and/or fifth planes, respectively, each of which is offset by the first distance from the nearest plane.

Alternatively, some of the circular members may extend to the first plane, such as one or two circular members with the largest diameters. Smaller diameter circular members may extend to a second plane which is offset from the first plane toward the piston-facing.

In examples where the suctions cups are offset from a plane 400 toward a piston-facing surface from a plane, the inner circular members will not attach or engage with a patient when a larger diameter circular member has attached to the patient. This may provide less suction which may be less damaging to the patient in some situations.

As illustrated in FIG. 6, the suction cup 600 may include ridges 622 located at a lower portion of one or more of the first circular member 606, the second circular member 608, and the third circular member 610. The ridges 622 can protrude from one or more of the first circular member 606, the second circular member 608, and the third circular member 610 to help improve and preserve attachment of the suction cup 600 to the patient.

Figure 7:
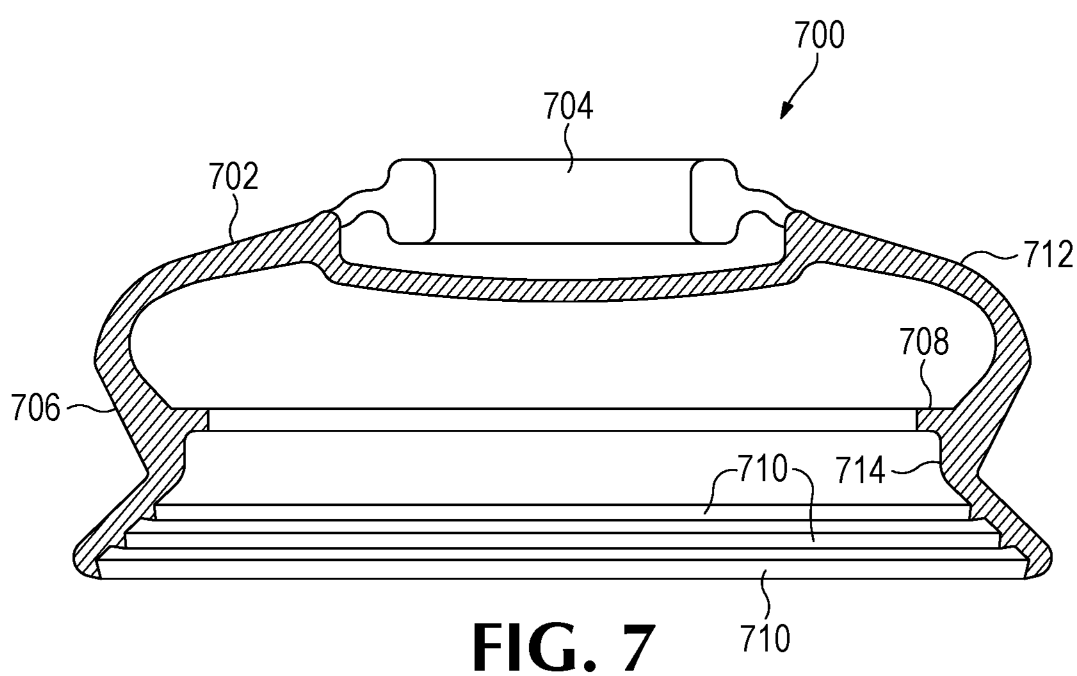
FIG. 7 is a front cross-section view of another suction cup according to some examples of the disclosure.

FIG. 7 is a cross-section view of a suction cup 700 according to some examples of the disclosure. The suction cup 700 can be easier to empty air out of than conventional suction cups, but provide rigidity when decompressing a chest of patient and prevent release of the suction cup 700. That is, the suction cup 700 has increased rigidity without increasing an amount of force to empty the suction cup of air to adhere to a chest of a patient.

Suction cup 700 may be higher than a conventional suction cup. For example, suction cup 700 may have an inside height of approximately 39 millimeters, compared to a conventional suction cup which has an inside height of approximately 22 centimeters. The suction cup 700 may also include a diameter of approximately 130 millimeters. The suction cup 700 includes a piston-facing surface 702 which can include a connector 704, similar to the piston-facing surfaces and connectors discussed above.

The suction cup 700 may include a suction member 706 that extends at a proximal end 712 away from the piston-facing surface 702. The suction member 706 includes an outward facing surface and an interior facing surface that forms a generally concave structure. A rigid member 708 can extend away from the interior surface 714 of the suction member 706, for example perpendicularly, within the concave structure. The suction member 706 in FIG. 7 is circular, but the suction member 706 may also be oval or an irregular shape that forms a concave structure. The rigid member 708 member extends from the interior surface 714 of the suction member 706 in a plane that is parallel to the piston-facing surface 702. In some examples, the rigid member 708 is generally or approximately halfway between the piston-facing surface and an end of the suction member 706.

The suction cup 700 may have a plurality of ridges 710 located at a lower portion, or lip, of the interior surface 714 of the suction member 706. The ridges 710 can protrude from the interior surface 714 of the suction member 706 so that when an upward force is applied to the suction cup 700 during decompression, the ridges 710 close out air and can prevent air from returning into the concave portion of the suction cup 700. For example, if an outer ridge 710 is compromised, an interior ridge 710 will prevent air from the compromised ridge 710 from entering the interior of the suction cup 700 and will preserve attachment to the patient.

Figure 8:
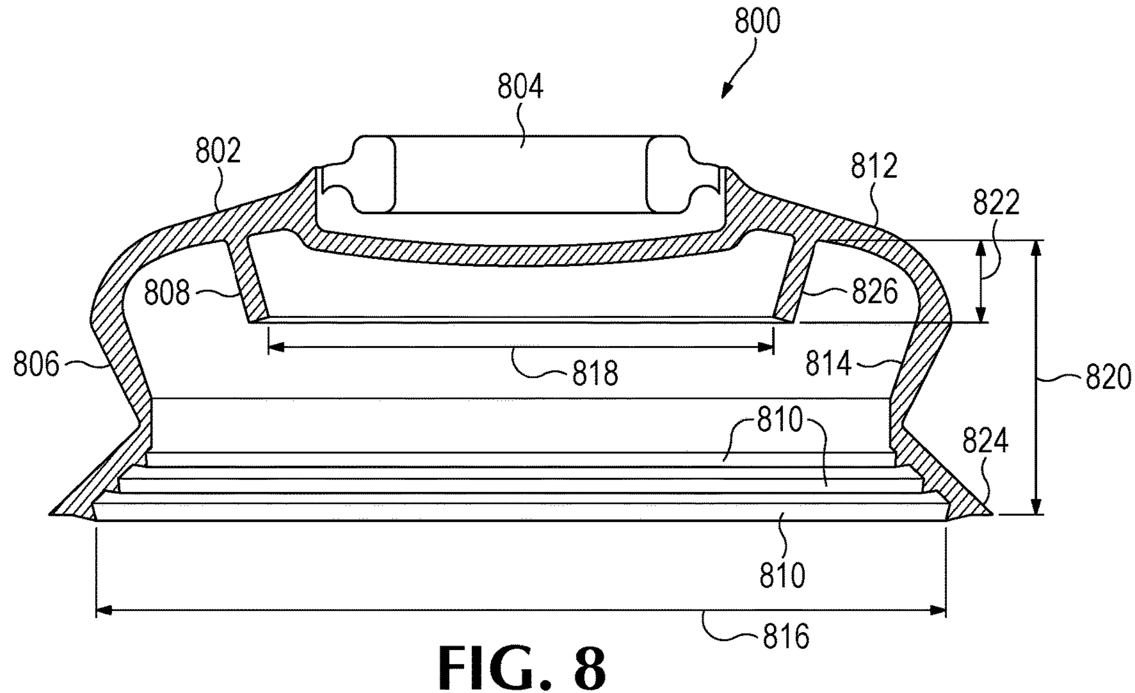
FIG. 8 is a front cross-section view of another suction cup according to some examples of the disclosure.

FIG. 8 illustrates a cross-section view of another example of a suction cup 800 according to some examples of the disclosure. Similar to the suction cup 700, the suction cup 800 includes a piston-facing surface 802, a connector 804, and a suction member 806 that extends at a proximal end 812 away from the piston-facing surface 802, which are similar to the piston-facing surface 702, connection 704, and suction member 706 and are not discussed further with respect to FIG. 8. A plurality of ridges 810 can protrude from the interior surface 814 at a distal end 824 of the suction member 806 to seal out air when an upward force is applied to the suction cup 800 during decompression.

Rather than having a rigid member 708 which protrudes away from an interior surface 814 of the suction member, a rigid member 808, or reinforcement, protrudes downward from the piston-facing surface 802 in the same direction as the suction member 806. The rigid member 808 has a diameter 818 at a distal end 826 of the rigid member 808 that is less than a diameter 816 of the suction member 806. The rigid member 808 has a length 822 that is less than half the length 820 of the suction member 806. As illustrated in FIG. 8, the respective lengths are determined from a common datum—the attached end of the rigid member 808 as illustrated, although other reference lines could be used. The rigid member 808 extending from the piston-facing surface 802 can reduce the force required to empty the suction cup 800 of air when attaching to a chest of a patient, but adds rigidity so that the suction cup 800 does not warp as easily when a pulling force, or decompression force, is applied.

Figure 9:
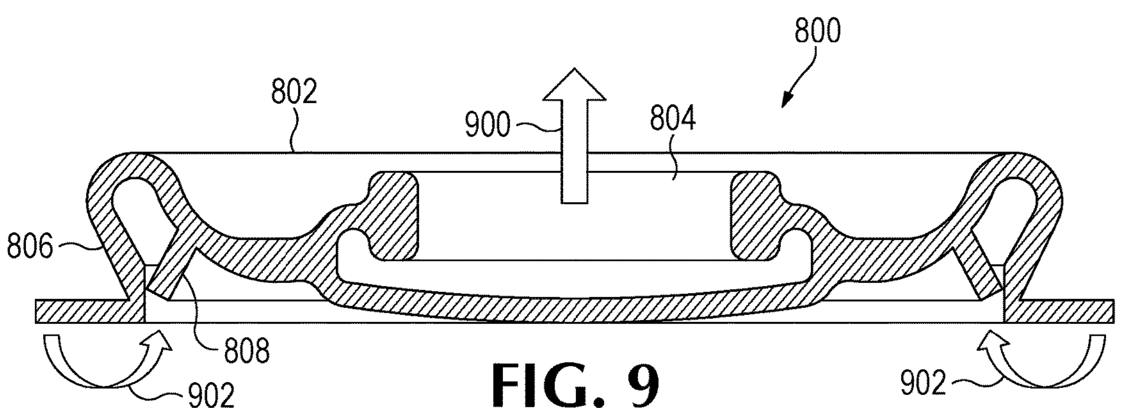
FIG. 9 is a front cross-section view of the suction cup 900 when compressed.

FIG. 9 illustrates a cross-section view of the suction cup 800 when air has been emptied out and the suction cup is attached to the patient. The rigid member 808 hinders the suction cup from warping or collapsing in on itself when a pull force is applied in the direction of arrow 900, such as during decompression of the chest of the patient.

Warping of the suction cup 800 usually occurs at the edge, or lip, as shown by the arrows 902. However, the rigid member 808 helps prevent that warping from occurring when the pulling force is applied to the suction cup 800.

Returning briefly to FIG. 2, while illustrated for the configuration of FIG. 2, any of the suction cups discussed above may include a one-way valve 224, such as, but not limited to, an umbrella valve or a duckbill valve, as will be understood by one of ordinary skill in the art. The valve 224, if added to any of the above-discussed suction cups, can help empty the air out of the suction cup faster when a force is applied. The valve 224 will also not lower the force it takes to overcome the rigidity of the suction cup, but the air cushion inside of the concave portion of the circular member (s) will be released more easily. That is, a suction cup with a valve 224 can be emptied with the same force, but the force would have to be applied for a longer period of time to a suction cup without the valve 224 to let all the air out. If time is crucial, then a suction cup without a valve 224 requires a larger force to let all the air out. In configurations, the valve 224 may be through the piston-facing surface 202 as illustrated in FIG. 2. In configurations, the valve 224 may be through at least one of the first circular member, the second circular member, or the third circular member.

Figure 10:
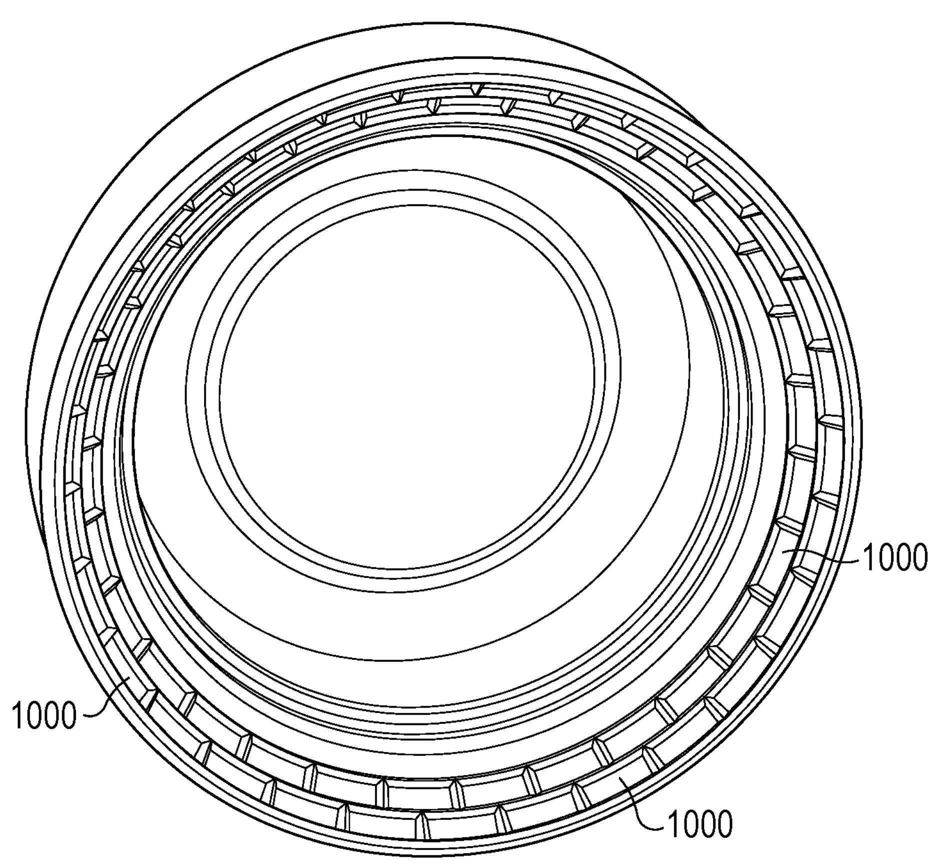
FIG. 10 is bottom perspective view of a suction cup having example ridges with cavities according to some examples of the disclosure.

FIG. 10 illustrates an alternative to the ridges discussed above in FIGS. 2-8. That is, the alternative ridges shown in FIG. 10 may be provided in any one of suction cup 200, suction cup 500, suction cup 600, suction cup 700, or suction cup 800. Instead of or in addition to the ridges illustrated in FIGS. 2-8, the ridges with individual cavities 1000 may be provided in each of the suction cups discussed above in FIGS. 1-8. The alternative ridges in FIG. 10 includes a plurality of different cavities 1000 to hinder air from returning back into the suction cup by creating a number of different air pockets.

As illustrated in FIG. 10, each of the cavities 1000 may be offset from an adjacent cavity on a different ridge. Although only two ridges of cavities 1000 are shown in FIG. 10, examples of the disclosure are not limited to two ridges of cavities but may have multiple ridges of cavities, such as, but not limited to, three or four ridges. Each of the cavities 1000 creates a pocket of air. If one cavity 1000 is compromised during a pulling force, or decompression force, the entire ridge itself is not compromised and the surrounding cavities are still able to grip the patient.

Different suction cup attachments may require that the mechanical compression device react or respond differently depending on the type of suction cup installed. In some examples of the disclosure, the suction cup may include a unique identifier embedded within the suction cup which can be recognized by the mechanical compression device.

Figure 11:
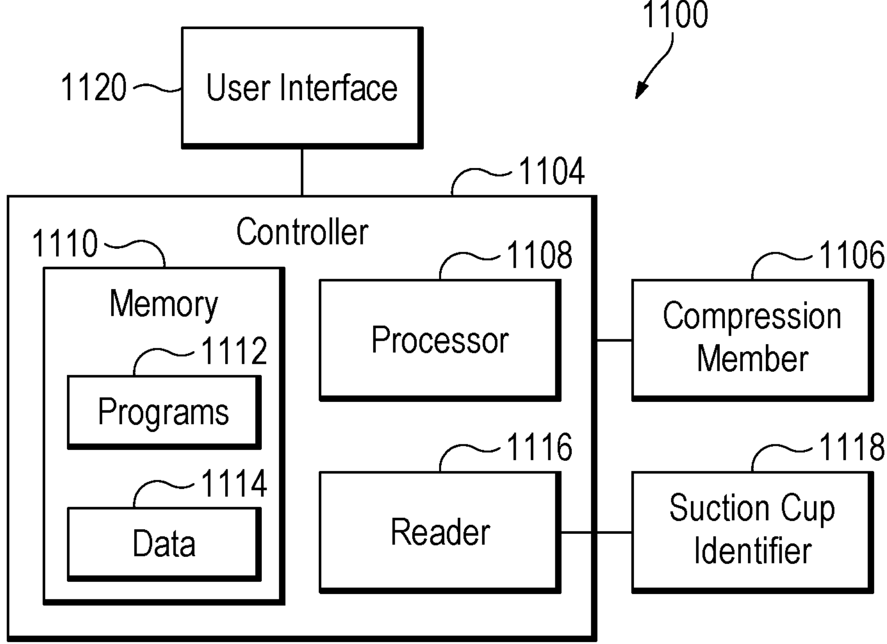
FIG. 11 is a schematic block diagram of a mechanical compression device according to some examples of the disclosure.

FIG. 11 illustrates an example schematic block diagram of a mechanical compression device 1100. The mechanical compression device 1100 of FIG. 11 may be, for example, the example mechanical CPR device 100 illustrated in FIG. 1. As will be understood by one skilled in the art, the mechanical compression device 1100 may include additional components not shown in FIG. 11. The mechanical compression device 1100 includes a controller 1104, which may be in electrical communication with compression member 1106, which can include a piston and a suction cup.

The controller 1104, as will be discussed in more detail below, provides instructions to the compression member 1106 to operate the compression member 1106 at a number of different rates, waveforms, depths, heights, duty cycles or combinations thereof that change over time. Example chest and/or abdomen manipulation instructions or protocols include compressing a chest and decompressing and/or expansions of a chest.

The controller 1104 may include a processor 1108, which may be implemented as any processing circuity, such as, but not limited to, a microprocessor, an application specific integration circuit (ASIC), programmable logic circuits, etc. The controller may further include a memory 1110 coupled with the processor 1108. Memory 1110 can include a non-transitory storage medium that includes programs 1112 configured to be read by the processor 1108 and be executed upon reading. The processor 1108 is configured to execute instructions from memory 1110 and may perform any methods and/or associated operations indicated by such instructions. Memory 1110 may be implemented as processor cache, random access memory (RAM), read only memory (ROM), solid state memory, hard disk drive(s), and/or any other memory type. Memory 1110 acts as a medium for storing data 1114, such as instructions for the compression member 1106 based on a type of suction cup attached, event data, patient data, etc., computer program products, and other instructions.

Controller 1104 may further include a reader 1116. The reader 1116 can receive a signal or otherwise sense a type of suction cup attached to the compression member 1106 through an identifier 1118 on or in the suction cup. The reader 1116 may be, for example, an RFID reader, a quick response (QR) code reader, or may just receive an input to receive a signal from a located on the suction cup.

The controller 1104 may be located separately from the compression member 1106 and may communicate with the compression member 1106 through a wired or wireless connection. The controller 1104 also electrically communicates with a user interface 1120. As will be understood by one skilled in the art, the controller 1104 may also be in electronic communication with a variety of other devices, such as, but not limited to, a communication device, another medical device, etc.

Operations of the mechanical compression device 1100 may be effectuated through the user interface 1120. The user interface 1120 may be external to or integrated with a display. For example, in some examples, the user interface 1120 may include physical buttons located on the mechanical compression device 1100, while in other examples, the user interface 1120 may be a touch-sensitive feature of a display. The user interface 1120 may be located on the mechanical compression device 1100, or may be located on a remote device, such as a smartphone, tablet, PDA, and the like, and is also in electronic communication with the controller 1104. In some examples, controller 1104 can receive a rate, a waveform, and/or depth input from the user interface 1120 and, responsive to the rate, the waveform, and/or depth input, cause the compression member 1106 to move to adjust the rate, waveform, and/or depth of the compression, decompression, or expansions during a session.

The suction cup, such as any one of the suction cups discussed above, may include the identifier 1118, which may be an RFID tag, a QR code on the suction cup, a chip, such as, but not limited to, an erasable programmable read-only memory, or any other identifier 1118 that has a proprietary code or other identification which can be ready by the reader 1116. The identifier 1118 may be located anywhere on or in the suction cup. For example, a chip or RFID tag may be located in a piston-facing surface. A QR code may be printed on the suction cup at any location that would be readable by the reader 1116. Alternatively, a chip may be located in a connector which can electrically connect to the controller through the piston when the suction cup is attached to the piston of the compression member 1106.

The identifier 1118 on the suction cup can identify the type of suction cup. The controller 1104 can instruct the compression member 1106 to operate based on the type of suction cup identified by the reader. For example, a pediatric suction cup may have an identifier that indicates it is for pediatric use. The controller 1104 can then instruct the compression member 1106 to operation in a pediatric mode and adjust, for example, at least one of the rates, waveforms, depths, heights, and/or duty cycles of the compression member 1106. As another example, an active decompression suction cup could be attached. When the reader 1116 reads the identifier 1118 from the active decompression suction cup, the controller 1104 may instruct the compression member 1106 to begin active decompressions.

The memory 1110 can store a number of CPR protocols that can be activated based on the identifier 1118 read by the reader 1116. The CPR protocols may include, for example, at least one of a pediatric CPR protocol, a universal suction cup CPR protocol, a pregnancy CPR protocol, and an active decompressions CPR protocol. The protocol may be activated by the controller 1104 based on the identifier 1118 stored on the suction cup. Examples of the disclosure, however, are not limited to these types of protocols and other protocols may also be stored in the memory 1110 and activated based on the identifier 1118 on the suction cup.

In other examples, rather than activating a specific CPR protocol based on the attached suction cup, the controller 1104 may unlock or activate certain features or settings of the mechanical compression device. For example, if an active decompression suction cup is attached and identified by the reader 1116, the controller 1104 may activate the active decompression feature, which a user may then select through the user interface 1120.

In some examples, if a universal suction cup, such as one of the suction cups illustrated in FIGS. 2-6 that can attach to a variety of different sized patients, is determined by the reader 1116 to be attached, the controller 1104 may begin a universal CPR suction cup protocol. This protocol may request that a user confirm through the user interface 1118 whether the suction cup is being used on an adult or a pediatric patient. That is, some suction cups may have an identifier 1118 which causes the controller 1104 to request for further information for the user before proceeding.

EXAMPLES

Illustrative examples of the disclosed technologies are provided below. A particular configuration of the technologies may include one or more, and any combination of, the examples described below.

Example 1 includes a suction cup for a cardiopulmonary resuscitation device, comprising: a piston facing surface having a connector structured to attach to a piston; a first circular member extending from the piston-facing surface; and a second circular member concentric to the first circular member extending from the piston-facing surface, the second circular member having a diameter that is less than a diameter of the first circular member.

Example 2 includes the suction cup of Example 1, wherein the first circular member extends to a reference datum defined by a distal end of the first circular member, in which the second circular member extends from the piston-facing surface to a distance other than to the reference datum.

Example 3 includes the suction cup of Example 1, wherein the first circular member and the second circular member extend from the piston-facing surface at an identical length.

Example 4 includes the suction cup of any of Examples 1-3, further comprising a third circular member concentric to the first circular member and the second circular member, the third circular member having a diameter that is less than the diameter of the second circular member.

Example 5 includes the suction cup of Example 4, wherein the first circular member, the second circular member, and the third circular member each extend from the piston-facing surface at different lengths.

Example 6 includes the suction cup of any of Examples 4-5, further comprising a fourth circular member concentric to the first circular member, the fourth circular member having a diameter that is less than the third circular member.

Example 7 includes the suction cup of Example 6, further comprising a fifth circular member concentric to the first circular member, the fifth circular member having a diameter that is less than the fourth circular member.

Example 8 includes the suction cup of any of Examples 1-7, wherein at least one of the first circular member or the second circular member include a plurality of ridges at a distal end that engages with a chest of a patient.

Example 9 includes the suction cup of any of Examples 1-8, wherein at least one of the first circular member or the second circular member include a plurality of cavities at a distal end that engages with a chest of a patient.

Example 10 includes the suction cup of any of Examples 1-9, wherein at least one of the first circular member or the second circular member includes a one-way valve.

Example 11 includes the suction cup of Example 10, wherein the one-way valve is an umbrella valve or duckbill valve.

Example 12 includes the suction cup of any of Examples 1-11, further comprising an identifier configured to output an identification of the suction cup when attached to the cardiopulmonary resuscitation device.

Example 13 includes the suction cup of Example 12, wherein the identifier includes a radio frequency identification tag, an integrated circuit, or a quick response code.

Example 14 includes the suction cup of any of Examples 12-13, wherein the identifier includes a proprietary code that indicates what type of suction cup is attached.

Example 15 includes a mechanical cardiopulmonary resuscitation (CPR) device, comprising: a piston; a suction cup, comprising: a piston facing surface having a connector structured to attach to the piston, a first circular member extending from the piston-facing surface, a second circular member concentric to the first circular member extending from the piston-facing surface, the second circular member having a diameter that is less than a diameter of the first circular member, and an identifier configured to output an identification of the suction cup when attached to the piston; and a processor configured to receive the identification of the suction cup when attached to the piston and to adjust a treatment protocol based on the identification of the suction cup.

Example 16 includes the mechanical CPR device of Example 15, wherein the processor is configured to adjust the treatment protocol based on the identification of the suction cup by being configured to: select a CPR protocol from a plurality of CPR protocols based on the identification of the suction cup; and cause the CPR device to perform the selected CPR protocol.

Example 17 includes the mechanical CPR device of Example 16, wherein the plurality of CPR protocols include at least one of a pediatric CPR protocol, a universal suction cup CPR protocol, a pregnancy CPR protocol, and an active decompressions CPR protocol.

Example 18 includes the mechanical CPR device of any of Examples 15-17, wherein the identification of the suction cup includes a radio frequency identification tag, an integrated circuit, or a quick response code.

Example 19 includes the mechanical CPR device of any of Examples 15-18, further comprising a reader configured to read the identification of the suction cup.

Example 20 includes the mechanical CPR device of any of Examples 15-19, wherein the identification of the suction cup includes a proprietary code that indicates what type of suction cup is attached.

Example 21 includes a suction cup for a cardiopulmonary resuscitation device, comprising: a piston facing surface having a connector structured to attach to a piston; a suction member that extends at a proximal end from the piston facing surface, the suction member having an interior surface that forms a concave structure; and a rigid member that extends away from the interior surface of the suction member within the concave structure.

Example 22 includes the suction cup of Example 21, wherein the suction member is circular.

Example 23 includes the suction cup of any of Examples 21-22, wherein the suction member includes a one-way valve.

Example 24 includes the suction cup of Example 23, wherein the one-way valve is an umbrella valve or a duckbill valve.

Example 25 includes the suction cup of any of Examples 21-24, wherein the suction member includes a plurality of ridges at a distal end of the interior surface.

Example 26 includes the suction cup of any of Examples 21-25, wherein the suction member includes a plurality of cavities at a distal end of the interior surface.

Example 27 includes the suction cup of any of Examples 21-26, further comprising an identifier configured to output an identification of the suction cup when attached to the cardiopulmonary resuscitation device.

Example 28 includes a suction cup for a cardiopulmonary resuscitation device, comprising: a piston facing surface having a connector structured to attach to a piston; a suction member that extends at a proximal end from the piston facing surface, the suction member having an interior surface that forms a concave structure and a first diameter; and a rigid member that extends from the piston facing surface, the rigid member having a second diameter that is less than the first diameter.

Example 29 includes the suction cup of Example 28, wherein the rigid member is less than half a length of the suction member.

Example 30 includes the suction cup of any of Examples 28-29, wherein the rigid member is concentric with the suction member.

Example 31 includes the suction cup of any of Examples 28-30, wherein the suction member includes a one-way valve.

Example 32 includes the suction cup of Example 31, wherein the one-way valve is an umbrella valve or a duckbill valve.

Example 33 includes the suction cup of any of Examples 28-32, wherein the suction member includes a plurality of ridges at a distal end of the interior surface.

Example 34 includes the suction cup of any of Examples 28-33, wherein the suction member includes a plurality of cavities at a distal end of the interior surface.

Example 35 includes the suction cup of any of Examples 28-34, further comprising an identifier configured to output an identification of the suction cup when attached to the cardiopulmonary resuscitation device.

Example 36 includes a mechanical cardiopulmonary resuscitation (CPR) device, comprising: a suction cup having an identifier; a compression mechanism configured to receive the identifier; and a processor configured to: receive the identifier from the suction cup, select a CPR protocol from a plurality of CPR protocols based on the identifier, and cause the compression mechanism to perform the selected CPR protocol.

Example 37 includes the mechanical CPR device of Example 36, wherein the identifier includes a radio frequency identification tag, an integrated circuit, or a quick response code.

Example 38 includes the mechanical CPR device of any of Examples 36-37, further comprising a reader configured to read the identifier on the suction cup.

Example 39 includes the mechanical CPR device of any of Examples 36-38, wherein the plurality of CPR protocols include at least one of a pediatric CPR protocol, a universal suction cup CPR protocol, a pregnancy CPR protocol, and an active decompressions CPR protocol.

Example 40 includes the mechanical CPR device of any of Examples 36-39, wherein the identifier includes a proprietary code that indicates what type of suction cup is attached.

For purposes of this description, certain aspects, advantages, and novel features of the examples of this disclosure are described herein. Features, integers, characteristics, compounds, chemical moieties or groups described in conjunction with a particular aspect, configuration, or example of the disclosure are to be understood to be applicable to any other aspect, configuration, or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The disclosure is not restricted to the details of any foregoing examples. The disclosure extends to any novel one, or any novel combination, of the features disclosed in this specification (including any accompanying claims, abstract and drawings), or to any novel one, or any novel combination, of the steps of any method or process so disclosed.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods.

As used herein, the terms “a”, “an”, and “at least one” encompass one or more of the specified element. That is, if two of a particular element are present, one of these elements is also present and thus “an” element is present. The terms “a plurality of” and “plural” mean two or more of the specified element. “Generally” or “approximately” as used herein means a variance of 10%.

As used herein, the term “and/or” used between the last two of a list of elements means any one or more of the listed elements. For example, the phrase “A, B, and/or C” means “A,” “B,” “C,” “A and B,” “A and C,” “B and C,” or “A, B, and C.”

As used herein, the term “coupled” generally means physically coupled or linked and does not exclude the presence of intermediate elements between the coupled items absent specific contrary language.

Additionally, this written description makes reference to particular features. It is to be understood that the disclosure in this specification includes all possible combinations of those particular features. Where a particular feature is disclosed in the context of a particular aspect or example, that feature can also be used, to the extent possible, in the context of other aspects and examples.

Also, when reference is made in this application to a method having two or more defined steps or operations, the defined steps or operations can be carried out in any order or simultaneously, unless the context excludes those possibilities.

Although specific examples of the disclosure have been illustrated and described for purposes of illustration, it will be understood that various modifications may be made without departing from the spirit and scope of the disclosure. Accordingly, the disclosure should not be limited except as by the appended claims.

We claim:

1. A suction cup for a cardiopulmonary resuscitation device, comprising:

a piston facing surface having a connector structured to attach to a piston;

a first circular member extending from the piston-facing surface in a direction away from an end of the piston and forming a suction cup, the first circular member having an interior surface that forms a concave structure; and a second circular member concentric to the first circular member extending from the piston-facing surface in the direction away from the end of the piston and forming a rigid member, the second circular member having a diameter at a distal end that is less than a diameter of the first circular member, wherein the distal end of the second circular member abuts the interior surface of the first circular member when the suction cup is compressed.

2. The suction cup of claim 1, wherein the first circular member includes a plurality of ridges at a distal end of the first circular member configured to engage with a chest of a patient.

3. The suction cup of claim 1, wherein the first circular member includes a plurality of cavities at a distal end of the first circular member configured to engage with a chest of a patient.

4. The suction cup of claim 1, wherein the first circular member includes a one-way valve.

5. The suction cup of claim 4, wherein the one-way valve is an umbrella valve or a duckbill valve.

6. The suction cup of claim 1, further comprising an identifier configured to output an identification of the suction cup when attached to the cardiopulmonary resuscitation device.

7. The suction cup of claim 6, wherein the identifier includes a radio frequency identification tag, an integrated circuit, or a quick response code.

8. The suction cup of claim 6, wherein the identifier includes a proprietary code that indicates what type of suction cup is attached.

9. The suction cup of claim 1, wherein the rigid member has a length that is less than half of a distance between the piston facing surface and a distal end of the first circular member configured to engage with a chest of a patient.

10. A mechanical cardiopulmonary resuscitation (CPR) device, comprising:

a piston;

a suction cup, comprising:

a piston facing surface having a connector structured to attach to the piston at an end of the piston, a first circular member extending from the piston-facing surface in a direction away from an end of the piston and forming a suction cup, the first circular member having an interior surface that forms a concave structure, a second circular member concentric to the first circular member extending from the piston-facing surface in the direction away from the end of the piston and forming a rigid member, the second circular member having a diameter at a distal end that is less than a diameter of the first circular member, wherein the distal end of the second circular member abuts the interior surface of the first circular member when the suction cup is compressed, and an identifier configured to output an identification of the suction cup when attached to the piston; and a processor configured to receive the identification of the suction cup when attached to the piston and to adjust a treatment protocol based on the identification of the suction cup.

11. The mechanical CPR device of claim 10, wherein the processor is configured to adjust the treatment protocol based on the identification of the suction cup by being configured to:

select a CPR protocol from a plurality of CPR protocols based on the identification of the suction cup; and cause the CPR device to perform the selected CPR protocol.

12. The mechanical CPR device of claim 11, wherein the plurality of CPR protocols include at least one of a pediatric CPR protocol, a universal suction cup CPR protocol, a pregnancy CPR protocol, and an active decompressions CPR protocol.

13. The mechanical CPR device of claim 10, wherein the identification of the suction cup includes a radio frequency identification tag, an integrated circuit, or a quick response code.

14. The mechanical CPR device of claim 10, further comprising a reader configured to read the identification of the suction cup.

15. The mechanical CPR device of claim 10, wherein the identification of the suction cup includes a proprietary code that indicates what type of suction cup is attached.

16. The mechanical CPR device of claim 10, wherein the first circular member includes a plurality of ridges at a distal end of the first circular member configured to engage with a chest of a patient.

17. The mechanical CPR device of claim 10, wherein the first circular member includes a plurality of cavities at a distal end of the first circular member configured to engage with a chest of a patient.

18. The mechanical CPR device of claim 10, wherein the first circular member includes a one-way valve.

19. The mechanical CPR device of claim 18, wherein the one-way valve is an umbrella valve or a duckbill valve.

20. The mechanical CPR device of claim 10, wherein the rigid member has a length that is less than half of a distance between the piston facing surface and a distal end of the first circular member configured to engage with a chest of a patient.

* * * * *